(12) United States Patent
Ran (10) Patent No.: US 8,630,455 B2
(45) Date of Patent: Jan. 14, 2014

(54) METHOD AND SYSTEM FOR AUDIENCE DIGITAL MONITORING

(75) Inventor: Yang Ran, Hanover, MD (US)

(73) Assignee: SET Corporation, Arlington, VA (US)

(*) Notice: Subject to any disclaimer, the term of this patent is extended or adjusted under 35 U.S.C. 154(b) by 260 days.

(21) Appl. No.: 13/187,181

(22) Filed: Jul. 20, 2011

(65) Prior Publication Data

US 2012/0027299 A1 Feb. 2, 2012

Related U.S. Application Data

(60) Provisional application No. 61/365,968, filed on Jul. 20, 2010.

(51) Int. Cl.
*G06K 9/00* (2006.01)

(52) U.S. Cl.
USPC ............................ 382/103; 382/173; 348/143

(58) Field of Classification Search
None
See application file for complete search history.

(56) References Cited

U.S. PATENT DOCUMENTS

| | | | | |
|---|---|---|---|---|
| 5,914,748 A * | 6/1999 | Parulski et al. | ............... | 348/239 |
| 6,263,088 B1 * | 7/2001 | Crabtree et al. | .............. | 382/103 |
| 6,611,622 B1 * | 8/2003 | Krumm | ......................... | 382/170 |
| 6,741,755 B1 * | 5/2004 | Blake et al. | ................... | 382/284 |
| 6,952,496 B2 * | 10/2005 | Krumm | ......................... | 382/170 |
| 7,003,136 B1 * | 2/2006 | Harville | ........................ | 382/103 |
| 7,136,525 B1 * | 11/2006 | Toyama et al. | ............... | 382/173 |
| 7,224,847 B2 * | 5/2007 | Zhang et al. | .................. | 382/254 |
| 7,280,673 B2 * | 10/2007 | Buehler et al. | ................ | 382/103 |
| 7,295,700 B2 * | 11/2007 | Schiller et al. | ................ | 382/159 |
| 7,409,076 B2 * | 8/2008 | Brown et al. | ................. | 382/103 |
| 7,428,314 B2 * | 9/2008 | Henson | ......................... | 382/103 |
| 7,526,102 B2 * | 4/2009 | Ozer | ............................. | 382/103 |
| 7,529,388 B2 * | 5/2009 | Brown et al. | ................. | 382/103 |
| 7,561,188 B2 * | 7/2009 | Kondo et al. | ............. | 348/222.1 |
| 7,664,292 B2 * | 2/2010 | van den Bergen et al. | ... | 382/103 |
| 7,676,081 B2 * | 3/2010 | Blake et al. | .................. | 382/164 |
| 7,813,528 B2 * | 10/2010 | Porikli et al. | ................. | 382/103 |
| 8,094,928 B2 * | 1/2012 | Graepel et al. | ................ | 382/154 |
| 8,107,680 B2 * | 1/2012 | Henson | ......................... | 382/103 |
| 8,280,165 B2 * | 10/2012 | Meng et al. | .................... | 382/173 |
| 8,284,249 B2 * | 10/2012 | Feris et al. | ..................... | 348/143 |
| 2003/0107649 A1 * | 6/2003 | Flickner et al. | ............... | 348/150 |

* cited by examiner

*Primary Examiner* — Manav Seth
(74) *Attorney, Agent, or Firm* — Arent Fox LLP (57) ABSTRACT

Aspects of the present invention allow for real-time people monitoring method and system for estimation of the size and flow density of a given group of people located in a given area of space. The method and system may be used to monitor live or recorded camera input, foreground segmentation, human tracking, height estimation, and dwell estimation. In particular, human detection may be achieved using a spatio-temporal variance analysis calculation methodology for moving target detection.

20 Claims, 6 Drawing Sheets

METHOD AND SYSTEM FOR AUDIENCE DIGITAL MONITORING

This application claims priority from U.S. Patent Application No. 61/365,968, filed on Jul. 20, 2010, titled "METHODS AND SYSTEMS FOR AUDIENCE DIGITAL MONITORING," and which is incorporated by reference herein in its entirety.

BACKGROUND OF THE INVENTION

1. Field of Invention

Aspects of the present invention relate to methods and systems for monitoring an area in space via an image capturing device. More particularly, aspects of the present invention relate to monitoring an audience in an area in space.

2. Description of Related Art

A number of important applications require the detection and counting of people to ensure, for example, security, safety, and to support site management. Examples include the monitoring of audiences located before a liquid crystal display (LCD) or other type of screen, the estimation of queue length in retail stores, and the flow density monitoring of entry points, bus terminals, train stations, and the like. Although person detection and counting systems are commercially available today, there is a need to address the challenges of real time ever moving audiences.

A variety of human detection technologies are well known in the related art. Audience counting systems via video provide a count of people entering and/or exiting a particular location, passageway or establishment. For instance, an audience counting system may provide a beam, e.g., an infrared beam, across the passageway to be monitored. As people enter or exit the passageway, the beam is temporarily interrupted, and a counter increases by one increment each time the beam is interrupted, thus counting the number of people that have crossed the beam. The audience counting system detects this interruption and increments or decrements its net internal count of people entering the passageway.

In addition, other human counting systems that report on the direction of travel of people through a particular passageway are available in the related art, but these systems tend to be complex and expensive. For example, directional counting systems utilize a foot-activated pressure-sensitive platform at the entry point of the passageway. Based on a pressure profile related to the engagement of an individual's foot with the platform, the system predicts the direction of travel of the individual. However, as discussed above, these systems are complex and expensive.

Other related art human counting systems are coupled with electronic article surveillance systems and an alarm management unit. In such systems, for example in large department stores that have a large number of articles that can be electronically tagged and a large number of people, the alarm management unit receives the electronic article surveillance data signal from the electronic article surveillance system and a human count signal from the human counting system, for facilitating correlation of electronic article surveillance and human count data.

However, none of these related art tracking-based techniques provides accurate results in precisely determining a number of people present within an area at least because human tracking under occlusion is a problem that has not yet been solved, and these systems tend to be inefficient because most of the computational power consumed is used to track the individuals, leaving little processing power for other tasks such as activity monitoring and behavior analysis. Additionally, some of these techniques are limited by the camera position, such as the overhead mounting requirement, and some require multiple cameras to build a three-dimensional image. Accordingly, these requirements are fulfilled at the expense of computing power.

SUMMARY OF THE INVENTION

In light of the above-described problems and unmet needs as well as others, aspects of the present application provide systems and methods for visual surveillance of an area that include exploiting relationships among the foreground pixel blobs and the number of human beings present in the area.

Aspects of the present invention allow for real-time people monitoring technology to be used for estimation of the size and flow density of a given group of people located in a given area of space. Exemplary aspects may include live or recorded camera input, foreground segmentation, human tracking, height estimation, and dwell estimation. In particular, human detection may be achieved using a spatio-temporal variance analysis calculation methodology for moving target detection. An exemplary system, according to various aspects of the present invention, may be operated in real time on an audience that contains multiple persons. Another exemplary method, according to aspects of the present invention, may be operated on previously recorded audiences containing multiple people.

Exemplary aspects of the present invention include people monitoring based on the output of background subtraction technology. Aspects of this invention may not rely on a tracking module, and hence may be more reliable and efficient. Exemplary aspects of the current invention reveal a simple relationship among the foreground pixels/blobs of the visual representation of the area being monitored and the number of people present in the area being monitored that is accurate for, for example, counting the number of people, monitoring people entering and exiting an area under surveillance and outputting flow density in real time. Aspects of the current invention may rely on the output of background subtraction technology and may dispense from relying on any tracking module, which renders such aspects of the present invention more reliable and more efficient.

Exemplary aspects of the current invention achieve detection accuracy of over 95% under a wide variety of controlled scenarios. Aspects of the current invention may be robust to many environmental conditions, such as lighting change, size and/or distance variation, occlusions, reflections, shadows, glare, and the like. Aspects of the current invention may require minimal training and calibration. Advantageous aspects of the current invention may include increased efficiency, and the requirement for a smaller amount of processing and memory resources. Such economy may provide a significant advantage over the related art by leaving computational power available for other tasks. Aspects of the current invention also have the potential to be implemented using, for example, digital cameras, as well as low cost hardware platforms such as Digital Signal Processor (DSP) and Flipchip Pin Grid Array (FPGA). Aspects of the invention may also be able to function with any format of video, including high-definition television (HDTV).

Exemplary aspects of the current invention allow counting of people in a crowded scene using a network of relatively simple image sensors compared to sensors typically used in related art systems, by using a geometric calculation methodology that computes bounds on the number and possible locations of people, using silhouettes computed by each sensor through background subtraction. According to various aspects, the system may not require initialization or runs in real time, and may not require computing feature correspondence across views. Thus, the computation cost may increase linearly, rather than exponentially, for example, with the number of cameras, which may result in a scalable and fault-tolerant system.

Additional advantages and novel features of these aspects of the invention will be set forth in part in the description that follows, and in part will become more apparent to those skilled in the art upon examination of the following or upon learning by practice thereof.

BRIEF DESCRIPTION OF THE DRAWINGS

Various exemplary aspects of the systems and methods will be described in detail, with reference to the following figures, wherein.

DETAILED DESCRIPTION OF PREFERRED ASPECTS

These and other features and advantages in accordance with aspects of this invention are described in, or are apparent from, the following detailed description of various exemplary aspects of the invention.

Figure 1:
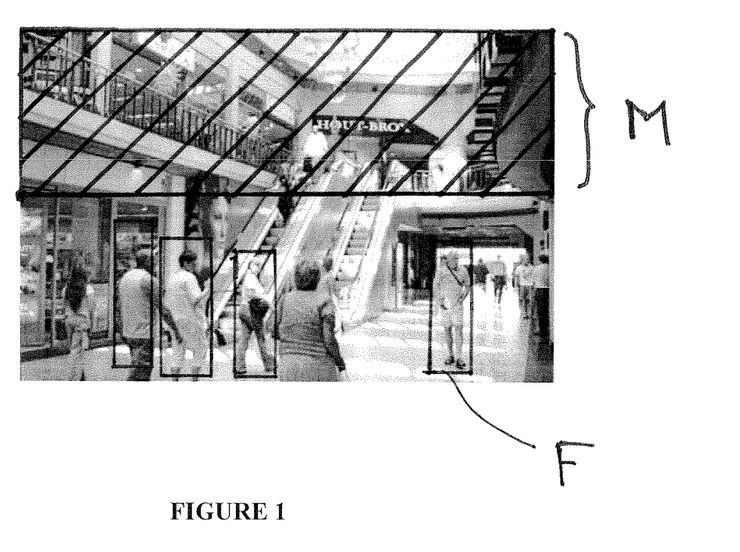
FIG. 1 is an illustration of a visual surveillance image, according to various exemplary aspects of the current invention.

FIG. 1 is an illustration of a visual surveillance image, according to various exemplary aspects of the current invention. According to various aspects of the current invention, a pixel counting-based method is provided to solve the above-discussed needs, as well as others. For example, considering that the average person is deemed to correspond to a fixed number of pixels in an image, such as the image illustrated in FIG. 1, then by counting a total number of pixels in the background, which may correspond to objects that are likely to be present regardless of any audience, the number of people present in the image may be derived. For example, the number of people present in the image may be derived by dividing the total number of pixels that are deemed to correspond to persons in the image frame by the number of pixels corresponding to a single average person, or blob. For example, a blob may be a group of pixels that may be associated to a single person, but may also be associated to a relatively large object. According to various aspects, the background may be recorded in advance, and the pixels corresponding to the background may be removed from the pixels of the overall picture to arrive at the pixels solely corresponding to the audience. Additionally, in order to differentiate between people located in different areas of the frame, or at different depths of the frame, a weight can be assigned to each pixel to take into account the distance between a person present in the frame and the image capturing device, or a relative distance of each person to a frame of reference. According to various aspects, the number of persons that are present in a given frame or image may be expressed with the following formula:

$$n = \text{sum}(M \cdot F \cdot W) \quad (1)$$

In equation (1), n is the number of people present in the area being monitored and which may be a portion or a whole of the image frame, and M, W and F are matrices corresponding to a frame mask (M), pixel weight (W) and foreground (F), respectively. At a pixel level, every pixel (i,j) may have a component $m_{i,j}$, a component $f_{i,j}$, and a component $w_{i,j}$. The pixels (i,j) may be the pixels of the image and calculated from a corner of the image. For example, in an image with a resolution of 1086×1086, then i may be a value between 1 and 1086 and j may also be a value between 1 and 1086. The frame mask (M), pixel weight (W) and foreground (F) are further discussed below.

Each entry in the matrix M, representing a frame mask and containing matrix elements $m_{i,j}$ corresponding to every pixel in the image frame, may have a binary value and delineate specific regions of interest for monitoring. For example, in FIG. 1, the mask M may illustrate that a region of interest is the first level of the mall captured in the figure and obstructs the second level of the mall. Thus, the mask corresponds to the obstructed part of the image that will not be analyzed. The values of the component $m_{i,j}$ for the pixels corresponding to the second level of the mall, shown by the hashed area in FIG. 1, may have a value of zero (0), and the value of the component $m_{i,j}$ for the pixels of the first level of the mall on FIG. 1, in the area that is not hashed, may have a value of one (1). Accordingly, the pixels corresponding to the mask M, or the hashed area in FIG. 1, may have a value for the component $m_{i,j}$ of zero. The value of zero will result in the pixels of the mask M not affecting the value of the total number of persons "n" in equation (1). Accordingly, monitoring of the people present in the image may only take into account the people present in the first level of the mall, in the region that is not hashed, regardless of any people that may be present in the area of the mall being masked by the mask M, or the hashed area, as shown in FIG. 1.

According to various aspects, each entry in the matrix W, containing matrix elements $w_{i,j}$ may carry the weight of each pixel, derived from scene and camera geometry. The weight of each pixel may include a measure of distance of the blob comprising the pixel from the image capturing device or from another frame of reference, as explained below with respect to equations (2)-(4), and may be an integer number or a real number.

The entries in the matrix F, corresponding to the areas labeled F in FIG. 1 and containing the components $f_{i,j}$, can also integer number or a real number. The real numbers (e.g., decimals) may represent a probability of whether a pixel belongs to the foreground or to the background. For example, pixels belonging to objects that move at least once over a predefined period of time may be considered to be part of the foreground and may be given a value for $f_{i,j}$ of one (1), but objects that remain still over the same predetermined period of time may be considered to be part of the background and may be given a value for $f_{i,j}$ of zero (0). In addition, pixels that move over longer periods of time than the predefined period of time may be given a decimal value between 0 and 1, corresponding to a probability that the pixel corresponds to a person. For the pixels that are given a value for $f_{i,j}$ of zero, these pixels may not affect the value of the total number of persons calculated as "n" in equation (1).

Thus, for each pixel, a calculation is made of the product of the three components $m_{i,j} \times w_{i,j} \times f_{i,j}$, and the sum total of these products is divided by the average number of pixels corresponding to a single person to derive the number of people present in the audience. As discussed above, for any pixel (i,j), if any component of the pixel is given a value of zero because the pixel is part of the mask, or is part of the background, or is given a weight of zero for a different reason, then the pixel (i,j) may not be counted in the calculation of the total number of people being monitored in equation (1). As a result, a pixel corresponding to the background of to a masked area cannot be erroneously counted as corresponding to a person of an audience being monitored. Accordingly, the sum total of all the pixels thus weighted represents the total number of persons that are present in the area being monitored. Because an average person is assigned a fixed number of pixels making up the blob representing that person, finding the number of people present in the area being monitored can be achieved by dividing the total number of pixels calculated as shown above by the fixed number of pixels that correspond to an average person.

According to various aspects of the current invention, an approach to monitoring an audience may include maintaining a model of the static background, i.e., an image of the area being monitored when no people are present, and comparing the current frame with the static background. For example, a moving object may be detected by detecting a change in the current frame compared to the static background. A connected component algorithm may be used to obtain connected regions, which may correspond to various moving objects. In addition, a' video frame may be rectified so that each scan line (row) corresponds to the horizontal lines in a real three-dimensional (3D) scene.

Figure 2:
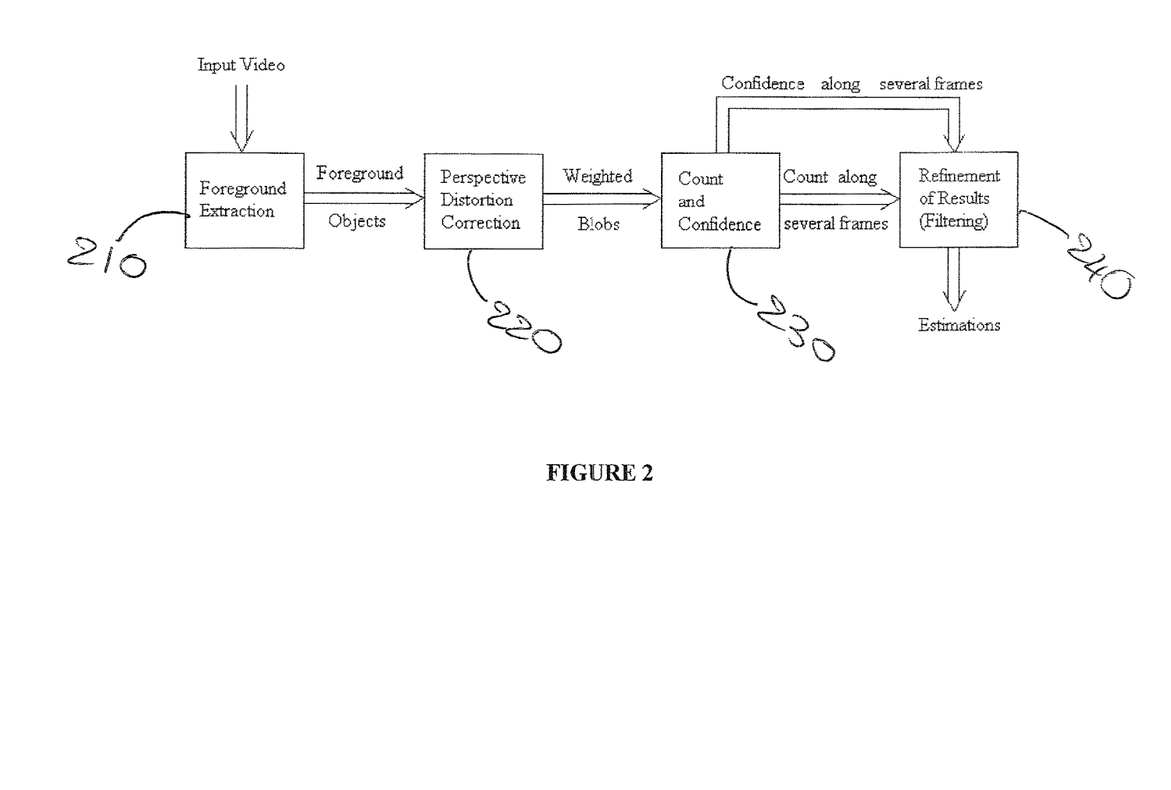
FIG. 2 is a flow chart illustrating a method of visual surveillance according to aspects of the present invention.

FIG. 2 is a representative flow chart illustrating a method of visual surveillance according to aspects of the present invention. According to various aspects of the current invention, the method starts with a foreground extraction 210 of an image input such as, for example, a video input. During foreground extraction, foreground objects, such as the individuals within boxes shown in FIG. 1, are defined and extracted. With reference to equation (1), foreground extraction corresponds to the extraction of the component $f_{i,j}$ of each pixel (i,j) that are part of the matrix F. When the foreground objects are extracted, according to various aspects, any perspective distortion due to the distance between the foreground objects and the camera or video lens may be corrected, as indicated with reference to Equations (2)-(4) below. According to various aspects, the foreground objects may include one or more blobs that are weighted based on their distance. As such, any distortion of size due to a person being closer or further than the objective lens of the camera may be eliminated. Once the blobs are determined to correspond to actual people, then the number of blobs, or people, can be calculated by counting the sum of the components of all the pixels as shown in equation (1). According to various aspects of the current invention, the count may be refined based on filtering of the video input.

Figure 3:
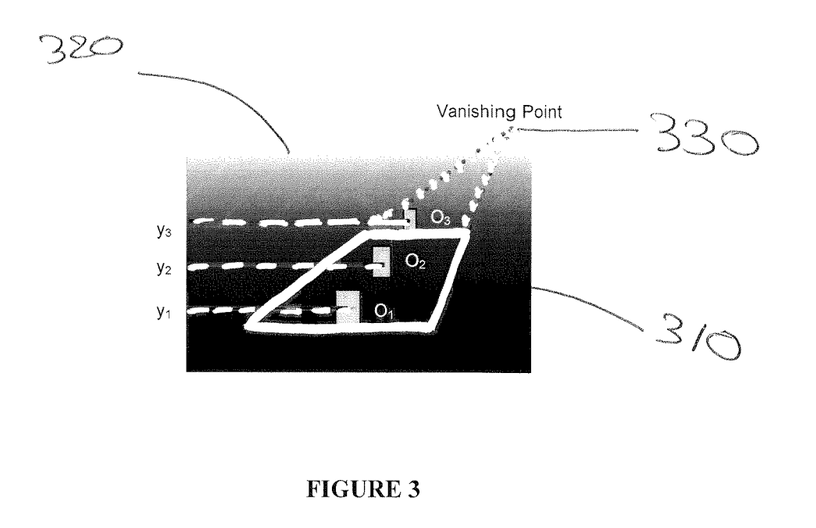
FIG. 3 is an illustration of an operating principle in accordance with exemplary aspects of the current invention.

FIG. 3 is an illustration of an operating principle of the calibration of an image, according to an exemplary aspect of the current invention. In FIG. 3, a perspective of an image 310, delimited by the solid white lines includes the three points $0_1$, $0_2$, and $0_3$ and is shown within an area under surveillance, and such an image may be used for calibration purposes. According to various aspects, the vanishing line 320 at the horizon may be parallel to the image horizontal scan lines, and the vanishing point 330, which corresponds to the point where the parallel lines of the image 310 that are perpendicular to the line 320 meet in space is shown in the distance. For example, theoretical lines, such as the solid white lines illustrated in FIG. 3, form a theoretical quadrangular geometric figure on the floor of an area being monitored. The three points labeled $O_1$, $O_2$ and $O_3$ are located at three different locations along a longitudinal direction of the quadrangle, perpendicularly to a surface of the image capturing device, and away from the image capturing device towards the vanishing point 330. According to various aspects, each of the three locations $O_1$, $O_2$ and $O_3$ may be given a parameter $y_i$ corresponding to their respective coordinates in a direction away from the capturing device and toward the vanishing point 330, with each coordinate representing a distance from the image capturing device or from another frame of reference. From this information, the following equation may be derived:

$$\frac{w_3}{w_1} = \frac{y_3 - y_{vanish}}{y_1 - y_{vanish}} \quad (2)$$

In equation (2), $w_3$ and $w_1$ are the weights in pixels at the back-most and front-most positions $O_1$ and $O_3$, and are proportional to a distance from the image capturing device. For example, the weight of a point that is closer to the image capturing device may be higher, or lower, than a weight of a point that is further to the image capturing device. Thus, the weight w calibrates the distance from the image capturing device. The coordinates $y_3$, $y_1$ and $y_{vanish}$ are the coordinates of the points $O_3$, $O_1$, and the horizontal vanishing point 330, respectively. From equation (2), $y_{vanish}$ can be calculated as:

$$y_{vanish} = \frac{w_3 y_1 - w_1 y_3}{w_3 - w_1} \quad (3)$$

According to various aspects, during calibration, the weights $w_1$ and $w_3$ are known, and $y_{vanish}$ can be calculated via the above equation (3), which represents the calibration of the image capturing device with respect to known objects and their respective known distances (e.g., sizes of human test subjects at various locations) to the image capturing device. Accordingly, the distance of the vanishing point $y_{vanish}$ can be calculated and firmly established. Once the coordinate $y_{vanish}$ is calculated, it becomes possible to calculate, for any given location y of any pixel, the corresponding weight w of the pixel, which represents the distance of the pixel from the image capturing device, as:

$$w = \frac{y - y_{vanish}}{y_3 - y_{vanish}} w_3 = r \cdot w_3 \quad (4)$$

According to various aspects, a similar calibration can be performed along a lateral direction that is perpendicular to the direction of coordinates y, $y_1$ and $y_3$. For example, lateral coordinates $z_{vanish}$, $z_1$ and $z_3$ can be determined along a lateral direction, similarly to the above description with respect to coordinates $y_{vanish}$, $y_1$ and $y_3$. As such, the weight of a pixel of coordinate z can be calculated along the lateral direction as:

$$w' = \frac{z - z_{vanish}}{z_3 - z_{vanish}} w'_3 = r' \cdot w'_3 \quad (4)'$$

According to various aspects, equations (4) and (4)' provide that for any location within the image frame, there exists a linear relation between the weight w in pixels and the reference weights $w_1$ or $w_3$, which are known. Accordingly, the weight of each pixel (i,j) can be derived from the spatial relationship of the pixel (i,j) to the calibrated theoretical point $y_{vanish}$. It should be noted that although the above equations and FIG. 3 illustrate the calibration along a direction perpendicular to the image capturing device, the same can be accomplished along a direction parallel to the image capturing device as discussed above, and the weight may also be calculated along the lateral direction z perpendicular to the direction y so as to encompass the entire image.

According to other aspects of the current invention, for every foreground pixel (i.e., a pixel for which the component $f_{i,j} \neq 0$), the foreground pixel may be counted as $r^2$ if the vertical and horizontal weight factors r and r' are assumed to be the same because equation (4) may be calculated in the y direction as well as in the z direction that is perpendicular to the y direction. When the vertical and horizontal weight factors r and r' are the same, the weight w is calculated in the y direction and the z direction, and may become a function of $r^2$. Based on the equations above, equation (1) can be first simplified by limiting the calculation to scan lines instead of individual pixels via the following equation:

$$\vec{n} = \begin{bmatrix} n_1 \\ n_2 \\ \dots \\ n_{H-1} \\ n_H \end{bmatrix} = \begin{bmatrix} 1 & 1 & \dots & 0 & 0 \\ 0 & 0 & \dots & 1 & 1 \\ \dots & \dots & \dots & \dots & \dots \\ 0 & 1 & \dots & 1 & 0 \\ 1 & 1 & \dots & 0 & 1 \end{bmatrix} = \hat{W}\vec{w} \quad (5)$$

In equation (5), n becomes a column vector $\vec{n}$ and represents the total number of people present in the image frame, $\hat{W}$ is the dot product of the mask M and the weight matrix W (M×W), and $\vec{w}$ is a new column vector, where each entry in the vector $\vec{w}$ describes the weight of each pixel in every scan line. Accordingly, the number of people N in that image frame can be directly obtained by summing all entries in $\vec{n}$, (i.e., $N=n_1+n_2+\dots+n_H$), and H is the number of scan lines of the image frame which represents the area being captured by the image capturing device.

In a simplified method of monitoring an audience, according to aspects of the current invention, the people present in the area being monitored may be represented by blobs that are vertical to the ground plane. According to this exemplary method, horizontal scan lines of the frame may be divided into J bands (j=1, 2, . . . J), where pixels in each band share a common weight, and a band corresponds to a plurality of scan lines, which facilitates the calculation of the total number of people present and saves processing power. The boundaries of these bands may intersect with one or more of the vertical blobs. The number of pixels may then be organized for all the sub-blobs within one band into a more compact manner, as illustrated in the following equation:

$$\vec{n} = \begin{bmatrix} r_{1,1} & r_{2,1} & \dots & r_{N-1,1} & r_{N,1} \\ r_{1,2} & r_{2,2} & \dots & r_{N-1,2} & r_{N,2} \\ \dots & \dots & \dots & \dots & \dots \\ r_{1,J-1} & r_{2,J-1} & \dots & r_{N-1,J-1} & r_{N,J-1} \\ r_{1,J} & r_{2,J} & \dots & r_{N-1,J} & r_{N-1,J} \end{bmatrix} \begin{bmatrix} w'_1 \\ w'_2 \\ \dots \\ w'_{J-1} \\ w'_J \end{bmatrix} = \hat{W}'\vec{w}' \quad (6)$$

In equation (6), $r_{i,j}$ is the number of pixels of blob i between adjacent bands j−1 and j; N is the number of blobs. It should be noted that N does not necessarily equal the number of people. Each row of $\hat{W}'$ may represent the number of 'macro-pixels', or pixels within a band, which is a group of horizontal scan lines.

According to various exemplary aspects of the current invention, the number of people may be obtained by summing all the entries for the column vector $\vec{n}$. It should be noted that most of $r_{i,j}$ may be equal to zero because each blob may only intersect with a very limited number of bands since there are less bands than scan lines in the image frame. Compared to equation (5), equation (6) provides a size of matrix $\hat{W}'$ that is much smaller than matrix $\hat{W}$, which may accelerate the computation process. The selection of J may determine the accuracy and efficiency trade-off. According to various exemplary aspects, this method counts the pixels on a blob level, not at a scan line level.

According to various aspects of the current invention, in real scenarios, the measurements of the foreground matrix F from a single frame may include outlier observations, due to poor background subtraction techniques, lighting variations, and occlusions, for example. A probabilistic approach may be taken to this problem, where the mean of the multi-frame measurements of F may be taken as an estimation. Under such filtering, the matrix F, and thus $\hat{W}'$, may become a floating matrix.

Figure 4:
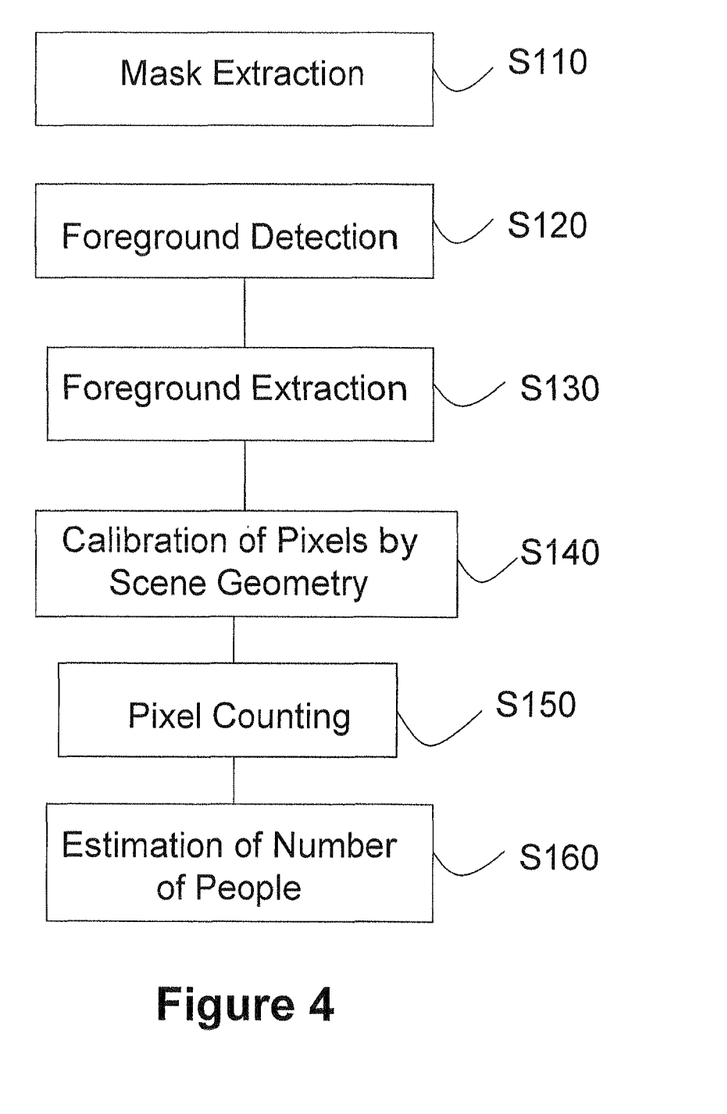
FIG. 4 is a flow diagram illustrating a method of visual surveillance, according to various exemplary aspects of the current invention.

FIG. 4 is a flow diagram illustrating a method of audience monitoring according to various aspects of the present invention, which includes a real-time or a recorded group of people being monitored while present in a given monitoring area. The source of image data for monitoring can include, for example, an audience image or video transmitted live via a camera, or an audience image or video that was previously recorded. Accordingly, both the signal of a live camera and that of a recorded video/image can be analyzed. Once the audience is recorded, or a live feed is received, the method starts in S110.

In S110, the mask component $m_{i,j}$ of every pixel (i,j) is checked, and if a pixel has a mask component $m_{i,j}$ that is equal to zero, indicating that the pixel is part of the mask and thus not part of the audience being monitored, then that pixel is eliminated and is not taken into account in further analysis. With reference to equation (1) above, a mask pixel does not affect the calculation of the number "n" because $m_{i,j}$ is equal to zero. Accordingly, during step S110, the only pixels that are considered during audience monitoring are those for which the mask component is non-zero. The below discussion will concern only those pixels for which the mask component is non-zero. Next, the method continues to S120, where the foreground is detected.

In S120, foreground detection is carried out using a foreground detector, which may be achieved using, for example, a spatio-temporal variance analysis calculation methodology for moving object detection, where objects that move at least once over a predefined period of time are considered to be part of the foreground, but objects that remain still over a same or other predetermined period of time are considered to be part of the background. According to various aspects of the current invention, foreground detection via the foreground detector allows a user to determine what portion of the recording is stationary and is part of the physical background or backdrop of the recording, and what portion of the recording is part of the foreground, which includes the audience. It should be noted that foreground may be detected contemporaneously with, or after, the video input is received. Also, pixels that show movement over a time longer than the predetermined time discussed above may be given a fractional value between zero and one for the foreground component $f_{i,j}$ to reflect a probability of being part of the foreground. Once foreground detection is performed in S120, foreground extraction S130 can be performed.

According to various aspects of the current invention, foreground extraction S130 may include the elimination of any pixels that correspond to the background. Another method of determining foreground is to capture an image of the area being monitored when no people are present, the pixels of this image representing background pixels. The foreground can then be determined by removing the background pixels, or by removing the background pixels and the mask pixels from the pixels, from the overall image. As discussed above with respect to equation (1), pixels of the image frame belonging to the background are given a value for the foreground component $f_{i,j}$ of zero, and are thus eliminated from the calculation, leaving only the pixels belonging to the foreground and which correspond to moving blobs, e.g., persons present in the area being monitored. Once foreground extraction is performed in S130, a calibration of the image frame can be performed in S140.

According to various aspects of the current invention, the geometry of the live frame or input video image is calibrated in S140. As illustrated in FIG. 3 and in equations (2)-(4) above, every pixel belonging to the foreground is weighted according to its distance in a depth-wise direction from the image capturing device. For example, a larger weight may be given to a pixel located far from the image capturing device and a smaller weight to a pixel located closer to the image capturing device. Accordingly, at S140, each pixel belonging to the foreground is given a weight that corresponds to its distance relative to the image capturing device during calibration of the image. Next, the method continues to S150.

According to various aspects of the current invention, once the image is calibrated in S140, the total number of pixels is counted in S150. Pixel counting may include counting pixels that are deemed to correspond to individual persons. It should be noted that the elimination of pixels that are part of the foreground but that are deemed not to correspond to people on the basis of other factors may also be performed during this step. For example, a determination is made, for each pixel that is part of the foreground, of whether the pixel may correspond to a person, or whether the pixel may correspond to, for example, a shadow or a reflection. According to various aspects, a minimum light intensity of a pixel may be used as a threshold. If the light intensity of the pixel is below the threshold, then that pixel may be considered to correspond to a shadow, reflection or other optical effect, but not to a person. On the other hand, if the light intensity of the pixel is at or above the threshold, then the pixel may be considered to belong to a blob corresponding to a person. A blob representing a person may be considered to be present in the image when a foreground pixel belonging to the blob has a value that is non-zero and a light intensity that is greater than the threshold. With respect to factor $f_{i,j}$, according to various aspects, the light intensity may also be incorporated in the value $f_{i,j}$. When a pixel is determined to correspond to a blob representing a person, the pixel is counted. Next, the method continues to S160.

According to various aspects of the current invention, the estimation of the number of people can be performed in S160. By assigning a fixed number of pixels to an average person, calculating the number of people present in the image frame can be achieved by dividing the total number of weighted pixels by the fixed number of pixels that correspond to an average person. Alternatively, and according to other aspects of the current invention, the weight of each pixel $w_{i,j}$ may already include a parameter that corresponds to one over the fixed number of pixels that correspond to an average person. In this case, the weight of each pixel $w_{i,j}$ is divided by the number of pixels corresponding to an average person, and the total number of persons present in the image frame can be calculated by simply summing up the total number of weighted pixels.

Figure 5:
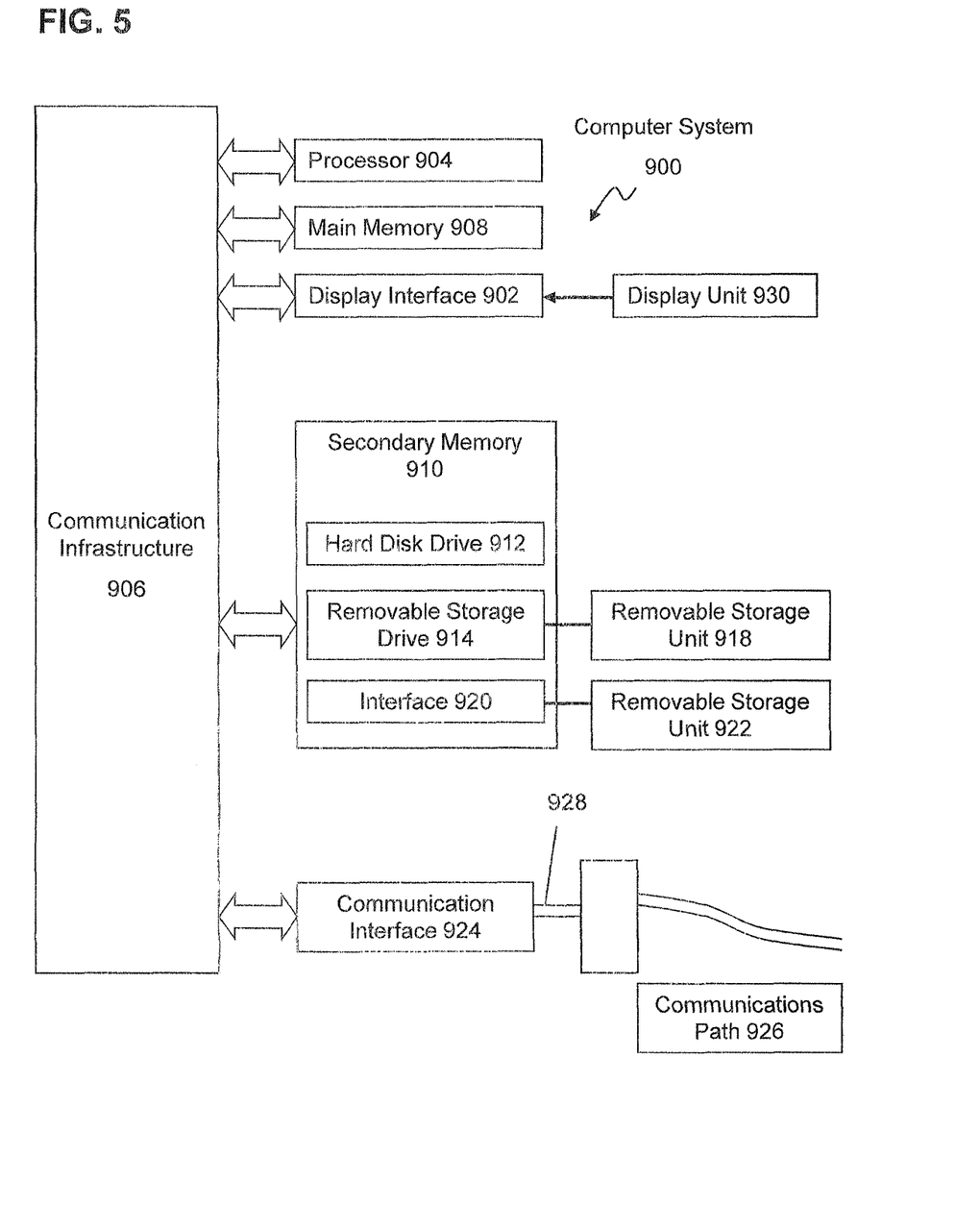
FIG. 5 presents an exemplary system diagram of various hardware components and other features, for use in accordance with aspects of the present invention.

FIG. 5 presents an exemplary system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 5.

Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 6:
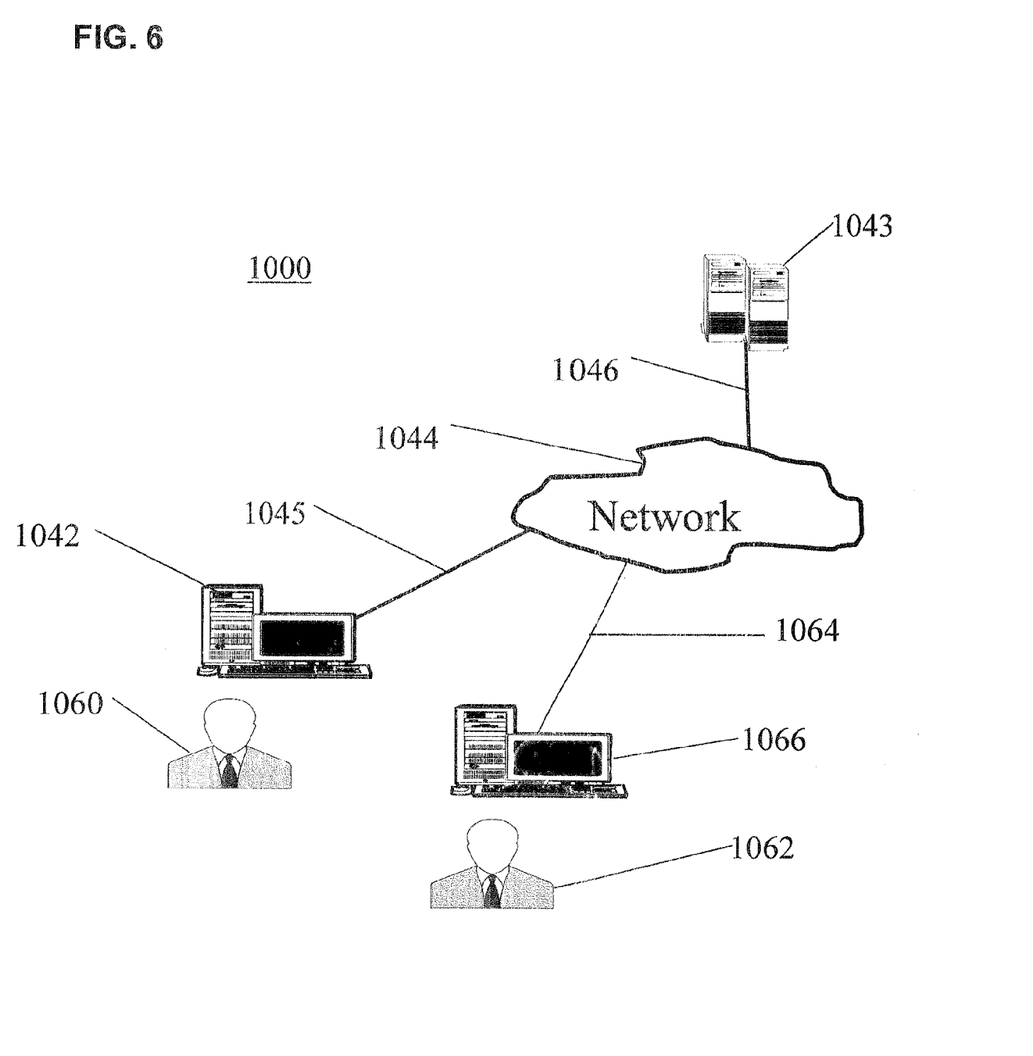
FIG. 6 is a block diagram of various exemplary system components, in accordance with aspects of the present invention.

FIG. 6 is a block diagram of various exemplary system components, in accordance with an aspect of the present invention. FIG. 6 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with the present invention is, for example, input and/or accessed via input devices 1040 such as cameras, image capturing devices, personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another aspect, the method and system of the present invention operate in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method of audience monitoring, including:
capturing an image having a plurality of image pixels, the image pixels including a plurality of mask pixels, a plurality of background pixels, and a plurality of foreground pixels;
determining a mask having the plurality of mask pixels, a background having the plurality of background pixels, and a foreground having the plurality of foreground pixels;
removing mask pixels and background pixels from the image pixels;
calibrating the foreground pixels;
determining a sum total of foreground pixels; and
determining a number of people present in the audience based on the calculation of the sum total of foreground pixels.

2. The method of claim 1, wherein calibrating the foreground pixels includes:
forming a theoretical parallelogram having parallel sides in the image, the parallelogram including a closest point having a coordinate $y_1$ along a direction parallel to one of the parallel sides and having a weight $w_1$, a farthest point having a coordinate $y_3$ along the direction and having a weight $w_2$, and a vanishing point having a coordinate $y_{vanish}$ along the direction, wherein the vanishing point $y_{vanish}$ corresponds to a projected meeting point of the parallel sides of the parallelogram in space;
calculating the coordinate v vanish according to:

$$y_{vanish} = \frac{w_3 y_1 - w_1 y_3}{w_3 - w_1}; \quad (1)$$

and
calculating a weight w of a pixel having a coordinate y according to:

$$w = \frac{y - y_{vanish}}{y_3 - y_{vanish}} w_3 = r \cdot w_3. \quad (2)$$

3. The method of claim 2, wherein calibrating the foreground pixels further includes:
determining a closest point having a coordinate $z_1$ along a direction perpendicular to one of the parallel sides of the parallelogram and having a weight $w'_1$, a farthest point having a coordinate $z_3$ along the perpendicular direction and having a weight $w'_2$, and a vanishing point having a coordinate $z_{vanish}$ along the perpendicular direction, wherein the vanishing point $z_{vanish}$ corresponds to a projected meeting point of lines that are perpendicular to the parallel sides of the parallelogram in space;
calculating the coordinate $z_{vanish}$ according to:

$$z_{vanish} = \frac{w'_3 z_1 - w'_1 z_3}{w'_3 - w'_1}; \quad (3)$$

and
calculating a weight w of a pixel having a coordinate z according to:

$$w' = \frac{z - z_{vanish}}{z_3 - z_{vanish}} w_3' = r' \cdot w_3'. \quad (4)$$

4. The method of claim 3, wherein determining the sum total of foreground pixels comprises:
   determining a mask matrix including the mask pixels;
   determining a weight matrix including respective weights of each foreground pixel; and
   calculating the following equation:

$$\vec{n} = \begin{bmatrix} n_1 \\ n_2 \\ \ldots \\ n_{H-1} \\ n_H \end{bmatrix} = \begin{bmatrix} 1 & 1 & \ldots & 0 & 0 \\ 0 & 0 & \ldots & 1 & 1 \\ \ldots & \ldots & \ldots & \ldots & \ldots \\ 0 & 1 & \ldots & 1 & 0 \\ 1 & 1 & \ldots & 0 & 1 \end{bmatrix} \begin{bmatrix} w_1 \\ w_2 \\ \ldots \\ w_{H-1} \\ w_H \end{bmatrix} = \hat{W}\vec{w}; \quad (5)$$

wherein $\vec{n}$ represents the sum total of foreground pixels; and
$\hat{W}$ is a product of the mask matrix and the weight matrix.

5. The method of claim 4, wherein determining the number of people present in the audience comprises dividing the sum total of foreground pixels by an average number of pixels per person.

6. The method of claim 3, further comprising:
   determining a mask matrix including the mask pixels;
   determining pixel bands that include pixels along a plurality of scanning lines of the image and forming a blob;
   determining a blob weight matrix including respective weights of each blob; and
   calculating a number of pixels as:

$$\vec{n} = \begin{bmatrix} r_{1,1} & r_{2,1} & \ldots & r_{N-1,1} & r_{N,1} \\ r_{1,2} & r_{2,2} & \ldots & r_{N-1,2} & r_{N,2} \\ \ldots & \ldots & \ldots & \ldots & \ldots \\ r_{1,J-1} & r_{2,J-1} & \ldots & r_{N-1,J-1} & r_{N,J-1} \\ r_{1,J} & r_{2,J} & \ldots & r_{N-1,J} & r_{N-1,J} \end{bmatrix} \begin{bmatrix} w_1' \\ w_2' \\ \ldots \\ w_{J-1}' \\ w_J' \end{bmatrix} = \hat{W}'\vec{w}'; \quad (6)$$

wherein $r_{i,j}$ is a number of pixels of blob i between adjacent bands;
$w'_i$ is a weight of each blob i; and
$\hat{W}'$ is a product of the mask matrix and the blob weight matrix.

7. The method of claim 6, wherein determining the number of people present in the audience comprises:
   dividing the sum total of the calibrated foreground pixels by an average number of pixels per person.

8. A system for audience monitoring, comprising:
   means for determining a mask for an image having a plurality of image pixels, the image pixels including a plurality of mask pixels, a plurality of background pixels, and a plurality of foreground pixels, the mask having the plurality of mask pixels, a background having the plurality of background pixels, and a foreground having the plurality of foreground pixels;
   means for removing at least a portion of the plurality of mask pixels and at least a portion of the plurality of background pixels from the image pixels;
   means for calibrating at least a portion of the plurality of foreground pixels;
   means for determining a sum total of the calibrated foreground pixels; and
   means for determining a number of people present in the audience based on the calculated sum total of calibrated foreground pixels.

9. The system for audience monitoring according to claim 8, wherein the means for calibrating the plurality of foreground pixels comprises:
   means for forming a virtual parallelogram having parallel sides in the image, the virtual parallelogram including a closest point having a coordinate $y_1$ along a direction parallel to one of the parallel sides and having a weight $w_1$, a farthest point having a coordinate $y_3$ along the direction and having a weight $w_2$, and a vanishing point having a coordinate $y_{vanish}$ along the direction, wherein the vanishing point $y_{vanish}$ corresponds to a projected meeting point of the parallel sides of the virtual parallelogram in space;
   means for calculating the coordinate $y_{vanish}$ according to:

$$y_{vanish} = \frac{w_3 y_1 - w_1 y_3}{w_3 - w_1}; \quad (7)$$

and
   means for calculating a weight w of a pixel having a coordinate y according to:

$$w = \frac{y - y_{vanish}}{y_3 - y_{vanish}} w_3 = r \cdot w_3. \quad (8)$$

10. The system for audience monitoring according to claim 8, wherein the means for calibrating the plurality of foreground pixels further comprises:
   means for determining a closest point having a coordinate $z_1$ along a direction perpendicular to one of the parallel sides of the virtual parallelogram and having a weight $w'_1$, a farthest point having a coordinate $z_3$ along the perpendicular direction and having a weight $w'_2$, and a vanishing point having a coordinate $z_{vanish}$ along the perpendicular direction, wherein the vanishing point $z_{vanish}$ corresponds to a projected meeting point of lines that are perpendicular to the parallel sides of the virtual parallelogram in space;
   means for calculating the coordinate $z_{vanish}$ according to:

$$z_{vanish} = \frac{w'_3 z_1 - w'_1 z_3}{w'_3 - w'_1}; \quad (9)$$

and
   means for calculating a weight w of a pixel having a coordinate z according to:

$$w' = \frac{z - z_{vanish}}{z_3 - z_{vanish}} w'_3 = r' \cdot w'_3. \quad (10)$$

11. The system for audience monitoring according to claim 10, wherein the means for determining the sum total of the calibrated foreground pixels comprises:
   means for determining a mask matrix including the plurality of mask pixels;

means for determining a weight matrix including respective weights of each of the calibrated foreground pixels; and means for calculating the sum total of the calibrated foreground pixels according to:

$$\vec{n} = \begin{bmatrix} n_1 \\ n_2 \\ \ldots \\ n_{H-1} \\ n_H \end{bmatrix} = \begin{bmatrix} 1 & 1 & \ldots & 0 & 0 \\ 0 & 0 & \ldots & 1 & 1 \\ \ldots & \ldots & \ldots & \ldots & \ldots \\ 0 & 1 & \ldots & 1 & 0 \\ 1 & 1 & \ldots & 0 & 1 \end{bmatrix} \begin{bmatrix} w_1 \\ w_2 \\ \ldots \\ w_{H-1} \\ w_H \end{bmatrix} = \hat{W}\vec{w}; \quad (11)$$

wherein $\vec{n}$ is the sum total of the calibrated foreground pixels; and $\hat{W}$ is a product of the mask matrix and the weight matrix.

12. The system for audience monitoring according to claim 10, further comprising:

means for determining a mask matrix including the plurality of mask pixels;

means for determining pixel bands that include any of the plurality of image pixels along a plurality of scanning lines of the image and forming a blob of pixels;

means for determining a blob weight matrix including respective weights of each blob of pixels; and means for calculating a sum total $\vec{n}$ of calibrated foreground pixels as:

$$\vec{n} = \begin{bmatrix} r_{1,1} & r_{2,1} & \ldots & r_{N-1,1} & r_{N,1} \\ r_{1,2} & r_{2,2} & \ldots & r_{N-1,2} & r_{N,2} \\ \ldots & \ldots & \ldots & \ldots & \ldots \\ r_{1,J-1} & r_{2,J-1} & \ldots & r_{N-1,J-1} & r_{N,J-1} \\ r_{1,J} & r_{2,J} & \ldots & r_{N-1,J} & r_{N-1,J} \end{bmatrix} \begin{bmatrix} w'_1 \\ w'_2 \\ \ldots \\ w'_{J-1} \\ w'_J \end{bmatrix} = \hat{W}'\vec{w}'; \quad (6)$$

wherein $r_{i,j}$ is a number of pixels of blob i between adjacent bands;

$w'_i$ is a weight of each blob i; and $\hat{W}'$ is a product of the mask matrix and the blob weight matrix.

13. A computer program product comprising a non-transitory computer usable medium having control logic stored therein for causing a computer to monitor an audience, the control logic comprising:

first computer readable program code means for determining a mask for an image having a plurality of image pixels, the image pixels including a plurality of mask pixels, a plurality of background pixels, and a plurality of foreground pixels, the mask having the plurality of mask pixels, a background having the plurality of background pixels, and a foreground having the plurality of foreground pixels;

second computer readable program code means for removing at least a portion of the plurality of mask pixels and at least a portion of the plurality of background pixels from the image pixels;

third computer readable program code means for calibrating at least a portion of the plurality of foreground pixels;

fourth computer readable program code means for determining a sum total of the calibrated foreground pixels; and fifth computer readable program code means for determining a number of people present in the audience based on the calculated sum total of calibrated foreground pixels.

14. A system for audience monitoring, the system comprising:

a processor;

a user interface functioning via the processor; and a repository accessible by the processor, wherein the processor is configured to:

determine a mask for an image having a plurality of image pixels, the image pixels including a plurality of mask pixels, a plurality of background pixels, and a plurality of foreground pixels, the mask having the plurality of mask pixels, a background having the plurality of background pixels, and a foreground having the plurality of foreground pixels;

remove at least a portion of the plurality of mask pixels and at least a portion of the plurality of background pixels from the image pixels;

calibrate at least a portion of the plurality of foreground pixels;

determine a sum total of the calibrated foreground pixels; and determine a number of people present in the audience based on the calculated sum total of calibrated foreground pixels.

15. The system of claim 14, wherein the processor is housed on a terminal.

16. The system of claim 15, wherein the terminal is selected from a group consisting of a personal computer, a minicomputer, a main frame computer, a microcomputer, a hand held device, and a telephonic device.

17. The system of claim 14, wherein the processor is housed on a server.

18. The system of claim 17, wherein the server is selected from a group consisting of a personal computer, a minicomputer, a microcomputer, and a main frame computer.

19. The system of claim 17, wherein the server is coupled to a network.

20. The system of claim 19, wherein the server is coupled to the network via a coupling.

* * * * *